Figure 1A:
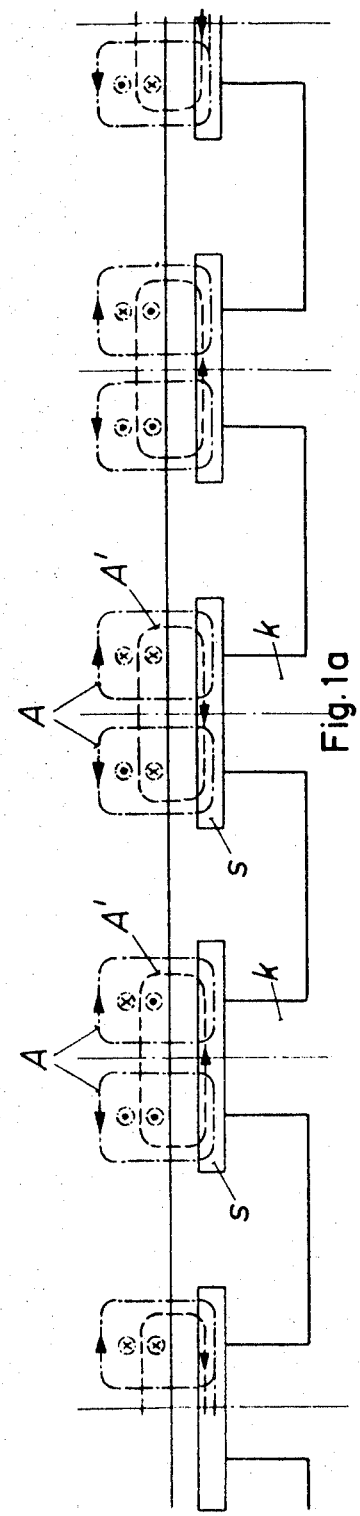

United States Patent

[11] 3,609,489

[72] Inventor: Kurt Baltisberger
 Birr, Switzerland
[21] Appl. No.: 879,243
[22] Filed: Nov. 24, 1969
[45] Patented: Sept. 28, 1971
[73] Assignee: Aktiengesellschaft Brown, Boveri & Cie
 Baden, Switzerland
[32] Priority: Nov. 28, 1968
[33] Switzerland
[31] 17711/68

[54] ARRANGEMENT FOR REDUCING POLE CORE CURRENTS IN SYNCHRONOUS MOTORS WITH SALIENT POLES
1 Claim, 4 Drawing Figs.

[52] U.S. Cl. .................................................. 318/173
[51] Int. Cl. .................................................. H02p 1/48
[50] Field of Search .................................... 318/173

[56] References Cited
UNITED STATES PATENTS
1,491,451  4/1924  Wieseman .................. 318/173 X Primary Examiner—Gene Z. Rubinson
Attorney—Pierce, Scheffler & Parker ABSTRACT: A synchronous motor is provided with a rotor of the salient pole type with a permanent connection for operation with an N number of poles but the stator winding is provided with a pole switching arrangement in order to reduce the pole core currents during a starting-up operation of the motor. During the initial phase of the start from standstill to about half, i.e. synchronous speed, the stator winding is connected in such manner as would correspond to a 2N-pole arrangement on the rotor. When the half normal speed is reached, the stator winding is then reconnected to correspond to the actual N-pole arrangement on the rotor.

2p = 8
ALL IN SERIES

2p = 4
TWO CIRCUITS
IN PARALLEL

INVENTOR.
Kurt Baltisberger
BY
Pierce, Scheffler & Parker
Attorneys

ARRANGEMENT FOR REDUCING POLE CORE CURRENTS IN SYNCHRONOUS MOTORS WITH SALIENT POLES

This invention relates to an improved arrangement for reducing pole core currents in synchronous electrical motors of the type having salient poles.

In synchronous machines having salient poles and which are started synchronously, the pole cores are penetrated by an alternating flux which can lead to considerably eddy currents at the surface of the pole cores and above all in the claws of the poles. Due to insufficient electrical contact between the pole claws and the rotor core, particularly when the machine is at a standstill, these contact points are endangered and can thus attain excessive temperatures.

Various measures are known for preventing these pole claw currents. By means of a damper ring or by providing connections between the poles it is possible to reduce the pole claw currents. It has also been proposed to connect together the claws of neighboring poles or to provide a connection between the pole claws and rotor core. The disadvantage of all these solutions is the very considerable constructional requirements which have to be fulfilled in order to obtain a reliable transmission of the high current in question, and furthermore the fact that the contact points are very highly stressed because it is also necessary to take into account the rise in temperature which occurs during the starting operation.

The purpose of the present invention is thus to provide an arrangement for diminishing the pole core currents in synchronous motors with salient poles which is very simple and avoids the disadvantages of the aforementioned previous solutions. In accordance with the invention, this is achieved by providing the synchronous motor with pole switching of the stator winding whereby when the motor is started and during the runup from standstill to about half the normal, i.e. synchronous speed the stator winding is connected in such manner as would correspond to a 2N-pole arrangement on the rotor and when approximately half the operating speed is reached the winding is reconnected to correspond to the actual and permanent N-pole arrangement on the rotor.

The arrangement according to the invention is based on the idea that during the first part of the starting operation the alternating flux should follow a path which is restricted to the pole shoes so that the occurrence of pole core currents is greatly reduced during this time.

Figure 1B:
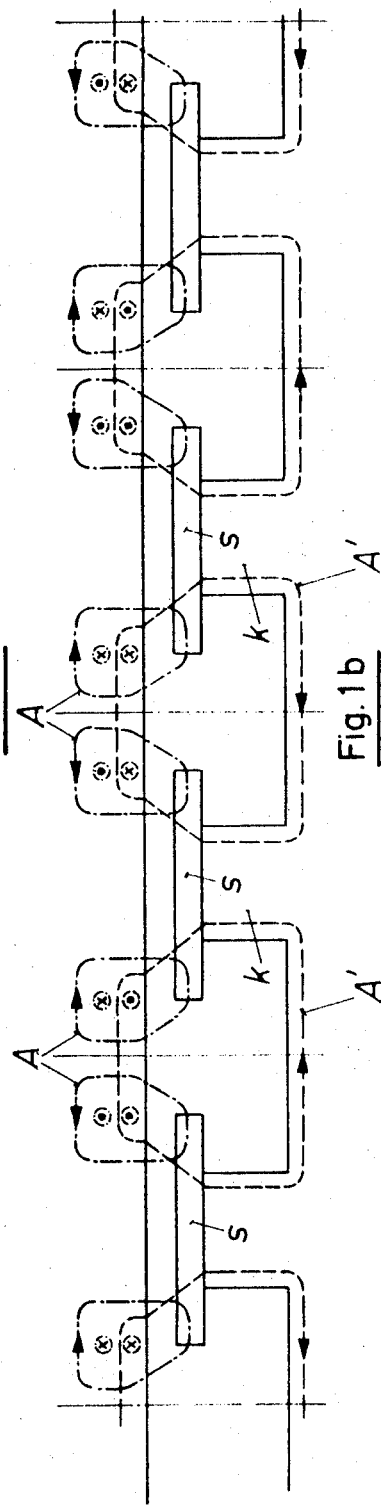
Figure 2A:
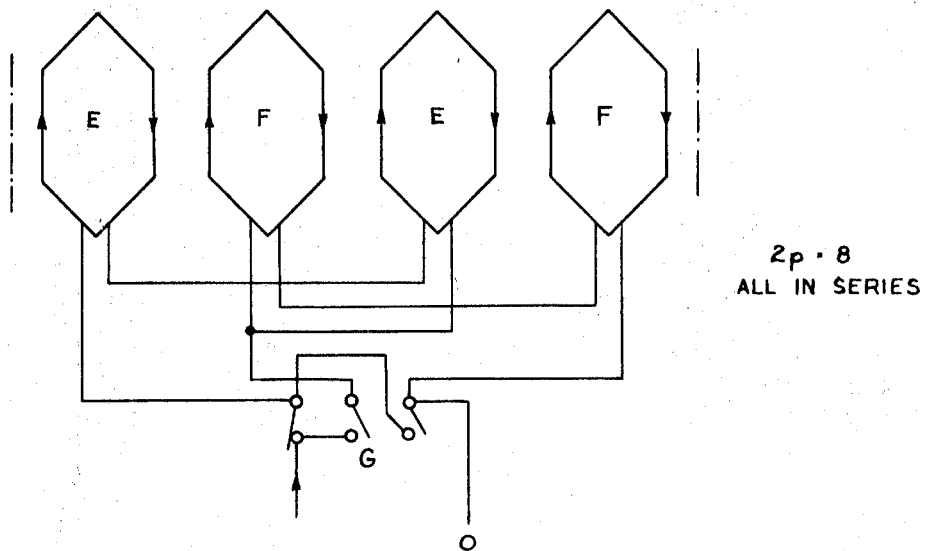
Figure 2B:
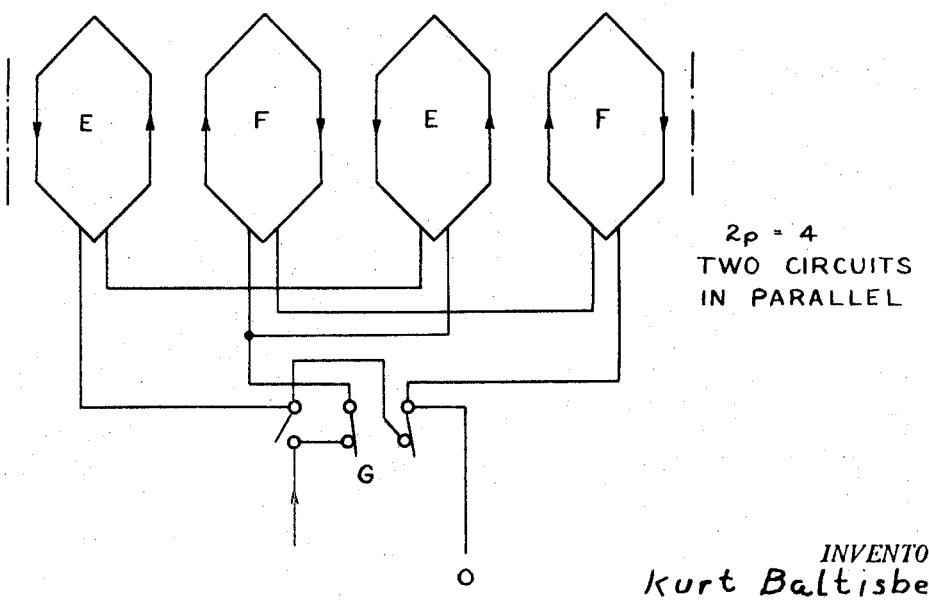

An embodiment of the invention will now be described in its application to a synchronous motor having a stator winding with pole changing in a pole ratio 2:1, for a number of poles $2p=8$, and $2p=4$, respectively, and is illustrated in the accompanying drawing wherein:

FIGS. 1a and 1b are different views in development of the pole wheel showing the course of the armature flux; and FIGS. 2a and 2b are circuit diagrams illustrating an arrangement for connecting different coil groups of the stator winding in series and in parallel, respectively the series connection being utilized at the start and the parallel connection being used after motor has reached approximately half its normal speed.

With reference now to the drawings, the pole core on the rotor are indicated by K and the pole shoes by S. The course of the armature flux for a number of poles $2p=8$ is indicated by the chain lines A and for the number of poles $2p=4$ by the broken lines A', the pole wheel being shown as a developed diagram in a longitudinal plane in FIG. 1a and in a transverse plane in FIG. 1b.

As shown in FIG. 1a, when starting up the motor from a standstill, the stator winding is connected for the double number of poles, that is for $2p=8$, whereby the armature field passes practically only through the pole shoe S and the undesirable pole core currents are very greatly reduced. As soon as the speed attains a value equal to approximately to half the operating speed, the poles are changed to the normal number, that is $2p=4$, by means of a switching device, and the motor is run up to the operating speed. During this second stage of the starting operation part of the armature flux flows through the pole cores K, as indicated in FIG. 1b. In this speed range, the centrifugal forces acting on the poles produce however, such a good electrical contact between the pole core or pole claw and the rotor body so that no unallowable temperature rise can occur at the points of contact.

By means of this pole-changing arrangement the energy which occurs in the pole shoe or in a starting winding during the entire starting operation is reduced to approximately half the amount which occurs when a conventional starting arrangement is used. The stator winding is divided into two circuits which are connected in series for the double number of poles and in parallel for the normal number of poles and hence the switching-in current will be reduced by approximately one-half owing to the smaller coil span factor resulting from the pole number doubling.

The switching arrangement for connecting the two circuits of the stator winding is illustrated schematically in FIGS. 2a and 2b respectively for one phase of the winding. During the first half of the starting period, $2p=8$ poles are in operation and coil groups E and F are connected in series as shown in FIG. 2a. The stator winding is thus connected in such manner as would correspond to a 2N-pole arrangement on the rotor. When approximately half the normal operating speed that is to say synchronous speed for double-pole operation is reached, switching device G is changed over so that for the second half the starting operation coil groups E and F are connected in parallel for normal pole operation with $2p=4$ poles, as shown in FIG. 2b. The stator winding is thus connected to correspond to the actual and permanent N-pole arrangement on the rotor.

As compared with a direct starting, the arrangement according to the present invention results in a lengthening of the starting time so that a starting transformer or else a choke coil which is now frequently provided for lengthening the starting time can be eliminated. Furthermore, since by doubling the pole number of the stator winding, with the rotor unchanged i.e. by arranging the coils of the stator winding for an initial connection that would correspond to a 2N-pole arrangement on the rotor, and then reconnecting the coils of the stator winding midway during the runup of the motor from stand still to normal speed to correspond to the actual and permanent N-pole arrangement on the rotor, not only will the pole claw currents be reduced but also no voltages will be induced in the rotor winding, so that the starting arrangement according to the invention is of advantage also in connection with brushless synchronous motors provided with rotating diodes. Short circuit rings and resistances are no longer necessary for the protection of the rotor winding against the induced voltages which otherwise occur when the motor is started.

I claim:

1. In a synchronous motor, the combination comprising a rotor permanently connected for operation with an N-number of salient poles, a stator having a winding thereon constituted by a plurality of selectively interconnectable coils, and switching means operable to establish an initial interconnection between said coils which would correspond to a 2N-pole connection of said rotor in bringing up the motor from standstill to substantially one-half its normal synchronous speed followed by a reconnection of said coils to correspond to the actual N-pole connection of said rotor thereby effecting a reduction in pole core currents during a starting-up of the motor.